(12) United States Patent
Chen et al.

(10) Patent No.: US 11,147,308 B2
(45) Date of Patent: Oct. 19, 2021

(54) ATOMIZING ASSEMBLY STRUCTURE EASY TO DISASSEMBLE

(71) Applicant: Shenzhen First Union Technology Co., Ltd., Shenzhen (CN)

(72) Inventors: Zhiquan Chen, Shenzhen (CN); Xiaoqiang Zhao, Shenzhen (CN); Changzheng Dai, Shenzhen (CN); Yonghai Li, Shenzhen (CN); Zhongli Xu, Shenzhen (CN)

(73) Assignee: Shenzhen First Union Technology Co., Ltd., Guangdong (CN)

( * ) Notice: Subject to any disclaimer, the term of this patent is extended or adjusted under 35 U.S.C. 154(b) by 480 days.

(21) Appl. No.: 16/010,508

(22) Filed: Jun. 17, 2018

(65) Prior Publication Data

US 2018/0360118 A1    Dec. 20, 2018

(30) Foreign Application Priority Data

Jun. 19, 2017    (CN) .......................... 201720712702.1

(51) Int. Cl.
| | |
|---|---|
| *A24F 13/00* | (2006.01) |
| *A24F 7/00* | (2006.01) |
| *A24F 40/485* | (2020.01) |
| *F16K 5/04* | (2006.01) |
| *H05B 3/44* | (2006.01) |
| *A24F 15/015* | (2020.01) |
| *A24F 40/10* | (2020.01) |

(52) U.S. Cl.
CPC ............. *A24F 7/00* (2013.01); *A24F 40/485* (2020.01); *F16K 5/04* (2013.01); *H05B 3/44* (2013.01); *A24F 15/015* (2020.01); *A24F 40/10* (2020.01)

(58) Field of Classification Search
CPC ........................................................ A24F 47/00
USPC ................................................. 131/328–329
See application file for complete search history.

(56) References Cited

U.S. PATENT DOCUMENTS

| | | | |
|---|---|---|---|
| 2016/0157522 A1* | 6/2016 | Zhu | .......................... A24F 40/46 |
| | | | 131/329 |
| 2017/0156408 A1 | 6/2017 | Li et al. | |
| 2018/0228219 A1* | 8/2018 | Qiu | ........................ A24F 47/008 |

(Continued)

FOREIGN PATENT DOCUMENTS

| | | |
|---|---|---|
| CN | 205 005 925 U | 2/2016 |
| EP | 3 031 339 A1 | 6/2016 |
| WO | 20150120623 A1 | 8/2015 |

*Primary Examiner* — Phuong K Dinh
(74) *Attorney, Agent, or Firm* — PROI Intellectual Property US; Klaus Michael Schmid

(57) ABSTRACT

An atomizing assembly structure is disclosed that is easy to disassemble. The atomizing assembly structure includes an atomizing sleeve, a threaded sleeve and an atomizing core. The atomizing sleeve has a lower end fixed to the threaded sleeve. The atomizing assembly structure further includes a tobacco liquid valve and a top cap. The atomizing core is arranged inside the tobacco liquid valve. The atomizing core and the tobacco liquid valve are in pluggable connection. The tobacco liquid valve has an upper end connected to the top cap through thread. The top cap covers and seals the atomizing sleeve. The atomizing assembly structure is simple in structure, easy to disassemble and regulate, convenient to clean and is leakage-proof, and thus greatly improves user experience.

17 Claims, 5 Drawing Sheets

(56) References Cited

U.S. PATENT DOCUMENTS

2019/0142069 A1\* 5/2019 Qiu ................... A24F 47/008
                                                                           131/329
2020/0000151 A1\* 1/2020 Fraser ................ A24F 47/008

\* cited by examiner

ATOMIZING ASSEMBLY STRUCTURE EASY TO DISASSEMBLE

TECHNICAL FIELD

The present disclosure relates to the field of electronic cigarettes, and particularly, to an atomizing assembly structure easy to disassemble.

BACKGROUND

Tobacco smoke contains dozens of carcinogens (for example, tar), which have a great harm to human health. Furthermore, the smoke hangs in air, making the surrounding people passive to breathe and causing damages to their bodies. Therefore, most public places have expressly forbidden smoking. In order to meet the need of some smokers, electronic cigarette appears accordingly.

For example, Chinese patent with Publication Number CN201510923184.3 discloses "a heating assembly, an atomizer and an electronic cigarette". Herein, an atomizing core may be taken out from an underside of the electronic cigarette only. It is difficult for non-professionals to take out the atomizing core. For example, they don't know how to operate; leakage of tobacco liquid is caused during the operation; etc. In addition, the atomizing core is an integrated structure and must be replaced once burning out.

SUMMARY

The technical problem to be solved by the present disclosure is to overcome the drawbacks of the prior art and provide an atomizing assembly structure which is easy to disassemble, easy to clean and convenient to refill tobacco liquid and is leakage-proof.

In order to solve the above technical problem, the present disclosure employs a technical scheme as follows. An atomizing assembly structure includes an atomizing sleeve, a threaded sleeve and an atomizing core. The atomizing sleeve has a lower end fixed to the threaded sleeve. The atomizing assembly structure further includes a tobacco liquid valve and a top cap. The atomizing core is arranged inside the tobacco liquid valve. The atomizing core and the tobacco liquid valve are in pluggable connection. The tobacco liquid valve has an upper end connected to the top cap through threads. The top cap covers and seals the atomizing sleeve.

The atomizing core includes a head end of the atomizing core and a tail end of the atomizing core, fixed together through threaded connection.

A tobacco liquid absorbing piece is arranged on an inner wall of the head end of the atomizing core, the tobacco liquid absorbing piece is hollow and tightly attached on the inner wall of the head end of the atomizing core, and a heating wire is arranged close to an inside wall of the tobacco liquid absorbing piece.

The tail end of the atomizing core overtops the tobacco liquid valve, and the tail end of the atomizing core is provided with a handle.

A spacing sleeve is arranged on a periphery of the tobacco liquid valve; the atomizing sleeve, the spacing sleeve and the top cap together define a liquid storage chamber.

A liquid path port is defined on a side wall of the spacing sleeve, a valve port is defined on a side wall of the tobacco liquid valve, and the tobacco liquid valve is capable of rotating around its own axial line.

An annular sealing ring is arranged between an inside of the atomizing sleeve and the threaded sleeve; another sealing ring is further arranged on a bottom of a lower end of the top cap, and the sealing ring is in tight fit with the periphery of the tobacco liquid valve.

An air passage pipe is arranged at a mid-part of the top cap, and the air passage pipe extends out of a bottom surface of the top cap; and a mouthpiece is connected to an upper end of the air passage pipe.

The air passage pipe has a lower end extending into the atomizing core, and a gap is defined between an outer wall of the air passage pipe and an inner wall of the atomizing core; the top cap defines an air hole, and the air hole is in communication with the gap between the air passage pipe and the atomizing core.

The threaded sleeve defines an air hole, and the air hole is in communication with the atomizing core.

The present disclosure has the following beneficial effects. The atomizing core and the tobacco liquid valve are in a pluggable connection. The atomizing core is convenient to replace and clean. It is convenient for users to plug and unplug the atomizing core from the upper side directly. Meanwhile, the atomizing core includes an atomizing core head end and an atomizing core tail end, and the atomizing core head end and the atomizing core tail end are fixed together through threaded connection. Therefore, the atomizing core head end may be replaced separately once damaged. Since the atomizing core tail end is not easy to damage, the overall maintenance and replacement cost may be reduced. The atomizing assembly according to the present disclosure may apply to two ways of air inflowing from the upper side and air inflowing from the lower side simultaneously. Such design has the features of openness and compatibility. In addition, tobacco liquid may be refilled from the upper side after the top cap is screwed off. It is convenient and intuitive for users to use.

DETAILED DESCRIPTION

Figure 1:
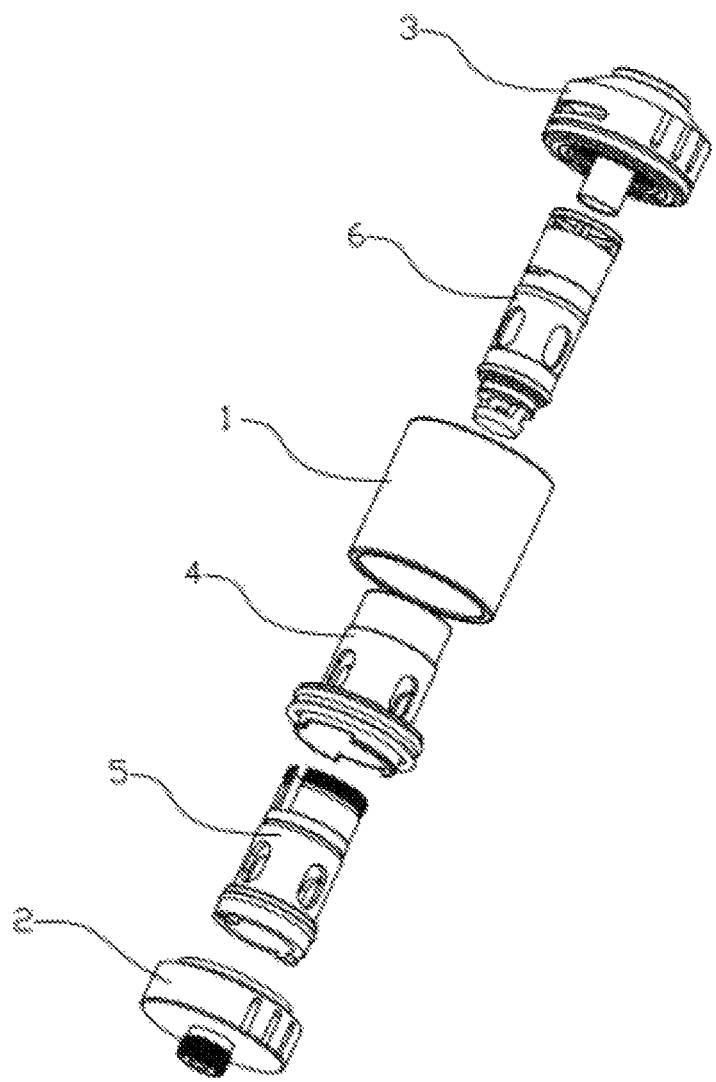
FIG. 1 is an exploded view of an atomizing assembly structure according to the present disclosure.
Figure 2:
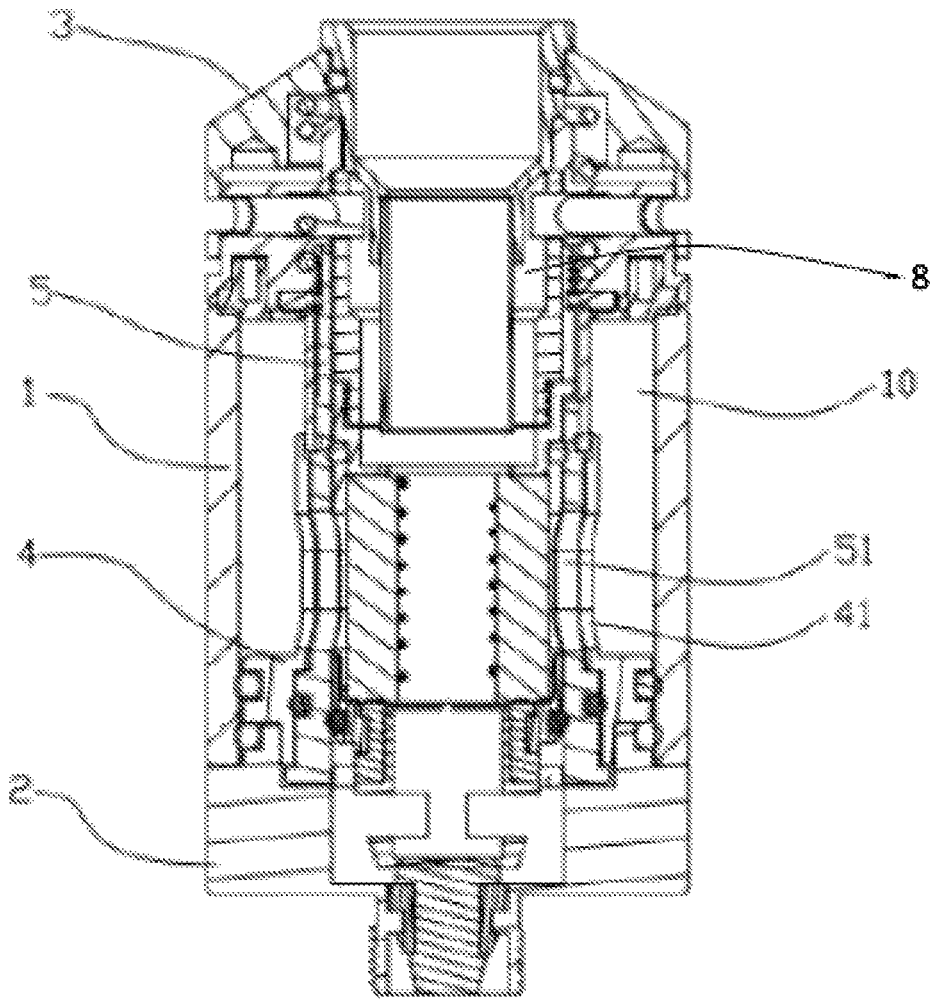
FIG. 2 is a cross-sectional view of an atomizing assembly structure according to the present disclosure.
Figure 3:
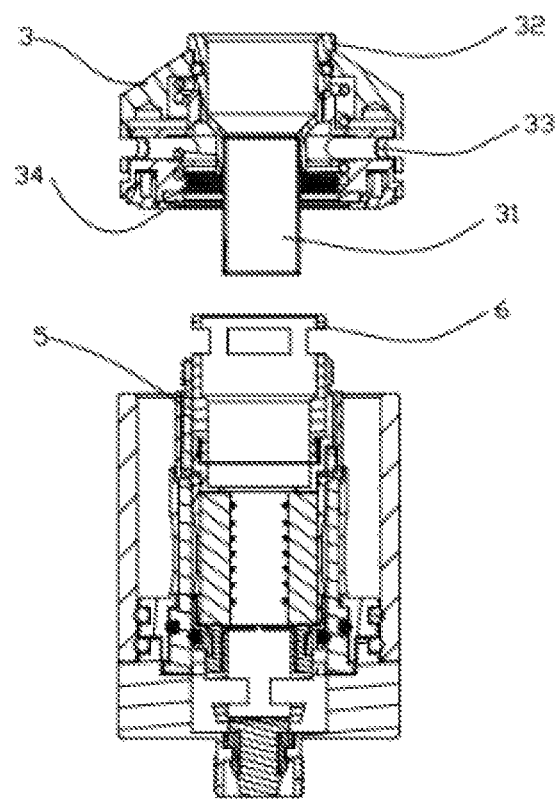
FIG. 3 is a cross-sectional view of an atomizing assembly structure having a top cap separated according to the present disclosure.
Figure 4:
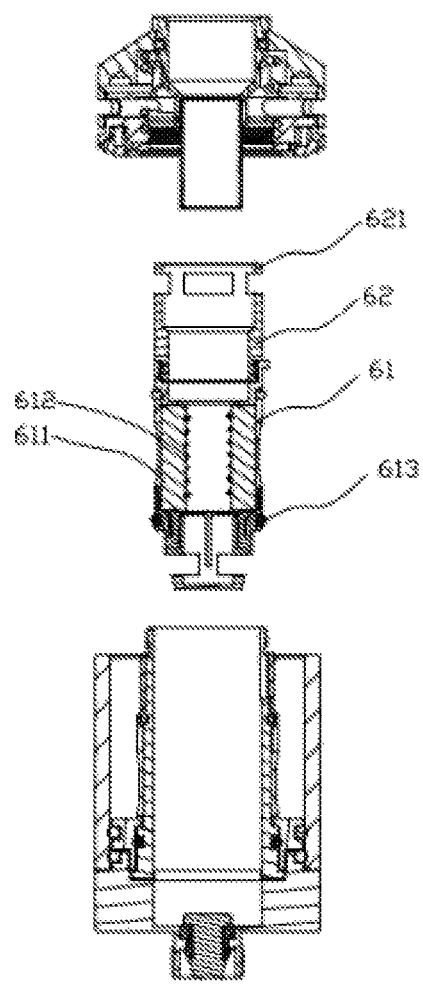
FIG. 4 is a cross-sectional view of an atomizing assembly structure having components completely separated according to the present disclosure.

The atomizing assembly structure of the present disclosure is described below in further detail in conjunction with the drawings.

As shown in FIG. 1 to FIG. 4, the atomizing assembly structure of the present disclosure is used in conjunction with a battery assembly. Specifically, the atomizing assembly structure has a lower end inserted into the battery assembly. The atomizing assembly structure and the battery assembly together form an electronic cigarette. The battery assembly is not show in FIG. 1. The utmost periphery of the atomizing assembly structure is an atomizing sleeve 1The atomizing sleeve 1 is a cylindrical hollow structure. The atomizing sleeve 1 has a lower end fixed to a threaded sleeve 2. Further, an annular sealing ring may be arranged between an inside of the atomizing sleeve 1 and the threaded sleeve 2, to prevent liquid-leakage. A top cap 3 covers the atomizing sleeve 1 from the upper side. An air passage pipe 31 is arranged at a central part of the top cap 3. The air passage pipe 31 extends out of a bottom surface of the top cap 3. A mouthpiece 32 is connected to an upper end of the air passage pipe 31. A certain gap 8 is defined between an outer wall of the air passage pipe 31 and an inner wall of the atomizing core 6. The top cap 3 has an air hole 33. The air hole is in communication with the gap 8 between the air passage pipe and the atomizing core.

A spacing sleeve 4 is further arranged on an upper end of the threaded sleeve 2. The spacing sleeve 4 is fixed to the threaded sleeve 2. An annular sealing ring is arranged between the spacing sleeve 4 and an inside of the atomizing sleeve 1. The atomizing sleeve 1, the spacing sleeve 4 and the top cap 3 together define a liquid storage chamber 10. The liquid storage chamber 10 is configured for storing tobacco liquid. A tobacco liquid valve 5 capable of rotating is arranged on an inside of the spacing sleeve 4. The tobacco liquid valve 5 is cylindrical too and the tobacco liquid valve 5 is capable of rotating around its own axial line. An atomizing core 6 is arranged on an inside of the tobacco liquid valve 5. The atomizing core 6 also defines a hollow airflow channel. The airflow channel is aligned to the air passage pipe 31. The atomizing core 6 includes a head end 61 of the atomizing core 6 and a tail end 62 of the atomizing core 6. The head end 61 of the atomizing core and the tail end 62 of the atomizing core bare fixed together through a threaded connection. A tobacco liquid absorbing piece 611 is arranged on an inside of the head end 61. The tobacco liquid absorbing piece 611 is a hollow body and is tightly attached on an inner wall of the head end 61. A heating wire 612 is arranged close to an inside of the tobacco liquid absorbing piece 611. The tobacco liquid absorbing piece 611 is made of any one of liquid absorbent cottons, porous ceramics or glass fiber materials. In addition, a sealing ring 613 is arranged between the head end 61 and the tobacco liquid valve 5. The sealing ring 613 is fixedly clamped on the head end 61.

In addition, a liquid path port 41 is defined on a side wall of the spacing sleeve 4, and a valve port 51 is defined on a side wall of the tobacco liquid valve 5. In a working state, the liquid path port 41 and the valve port 51 are located at corresponding intercommunicated positions, the tobacco liquid in the liquid storage chamber 10 flows to the tobacco liquid absorbing piece 611, and the tobacco liquid also contacts the heating wire 612. The heating wire 612 is connected to the battery assembly, and the tobacco liquid is aerosolized by the heating wire 612. The aerosolized aerosol flows through the hollow core part of the tail end 62 of the atomizing core 6, the air passage pipe 31 and the mouthpiece 32 and finally is inhaled by a user. The spacing sleeve 4 and the tobacco liquid valve 5 are capable of rotating around the axial line relative to each other. When the liquid path port 41 and the valve port 51 are aligned, the liquid path is open. When the liquid path port 41 and the valve port 51 are closed relative to each other, the liquid path is blocked while the tobacco liquid in the liquid storage chamber does not flow to the atomizing core head end 61. Therefore, a leakage prevention effect is achieved.

The tobacco liquid valve 5 has an upper end extending out of the spacing sleeve 4. Threads are provided on the extended part at the upper end of the tobacco liquid valve 5. The tobacco liquid valve 5 is connected to the top cap 3 through the threads. Therefore, when the tobacco liquid in the liquid storage chamber 10 is less than a preset minimum amount, a user may screw off the top cap 3 manually. While the top cap 3 is rotated, the top cap 3 drives the tobacco liquid valve 5 to rotate by certain angle, at such time the liquid path port 41 and the valve port 51 are closed, and tobacco liquid may be refilled from an opening on the upper end of the liquid storage chamber 10. This operation is labor saving and convenient. The atomizing core 6 and the tobacco liquid valve 5 are in piston-type moveable connection. The tail end 62 of atomizing core 6 overtopsa top end of the tobacco liquid valve 5. Therefore, when the atomizing core 6 burns out or needs to be cleaned and maintained, the user may easily pull out the atomizing core 6 separately from the upper side. The tail end 62 of the atomizing core 6 is provided with a handle 621 which is convenient for the user to hold when rotating and pulling out the atomizing core. In addition, for further convenience of maintenance, the atomizing core 6 includes the head end 61 and the tail end 62 of the atomizing core 6 that are in threaded connection. Such arrangement has a benefit that the head end 61 and the tail end 62 may be separated or assembled quickly. If the atomizing core 6 is an integrated structure, the entire atomizing core will be scrapped once burning out. In the present disclosure, the heating wire 612 is located at the head end 61. Even if the head end 61 burns out, the tail end 62 is still perfectly usable, and only a part of the atomizing core needs to be replaced. In addition, the detachable design of the atomizing core 6 is more beneficial for cleaning.

A sealing ring 34 is further arranged on a bottom of a lower end of the top cap 3, and the sealing ring 34 is in tight fit with the periphery of the tobacco liquid valve 5, to ensure that the tobacco liquid does not enter the smoke airflow channel in the middle.

Figure 5:
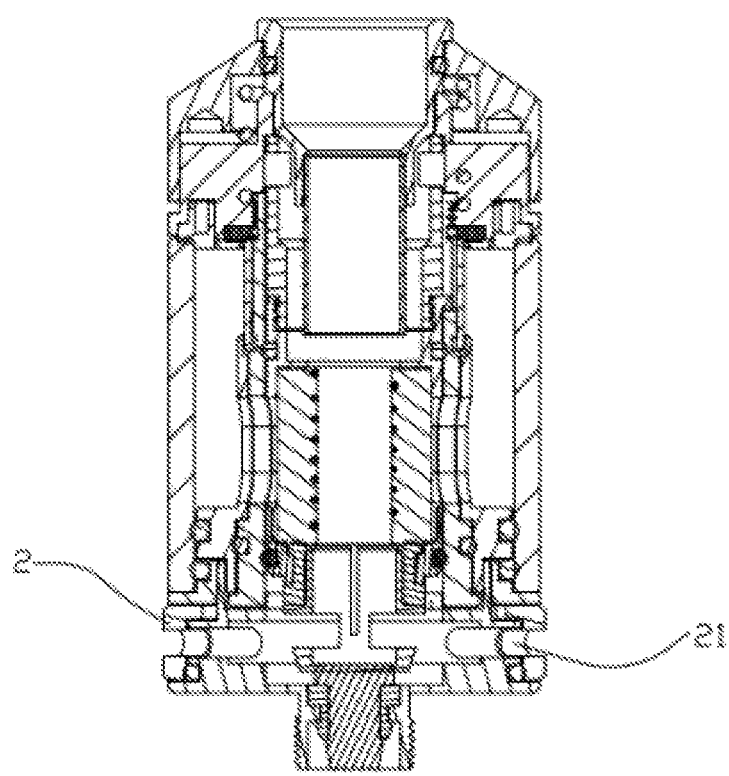
FIG. 5 is a diagram illustrating an atomizing assembly structure with air inflowing from the lower side according to the present disclosure.

As shown in FIG. 5, the threaded sleeve 2 defines an air hole 21, and the air hole 21 is in communication with the atomizing core. The atomizing assembly according to the present disclosure may apply to two ways of air inflowing from the upper side thereof and air inflowing from the lower side thereof simultaneously. Such design has the features of openness and compatibility.

The above embodiments are merely partial implementations listed in the description to help understand the content of the present disclosure, and they neither restrict the technical scheme of the present disclosure, nor make an exhaustion of all schemes implementable. Any minor improvements or equivalent substitutions made to the structures, processes or steps of the present disclosure are intended to be included in the scope of protection of the present disclosure.

What is claimed is:

1. An atomizing assembly structure, comprising an atomizing sleeve, a threaded sleeve and an atomizing core, the atomizing sleeve having a lower end fixed to the threaded sleeve, the atomizing assembly structure further comprising a tobacco liquid valve and a top cap, wherein the atomizing core is arranged inside the tobacco liquid valve, the atomizing core and the tobacco liquid valve are in pluggable connection, the tobacco liquid valve has an upper end connected to the top cap through threads, and the top cap covers and seals the atomizing sleeve;

wherein the atomizing core comprises a head end of the atomizing core and a tail end of the atomizing core, and the head end and the tail end of the atomizing core are fixed together through threaded connection, and the head end and the tail end of the atomizing core are in threaded connection.

2. The atomizing assembly structure according to claim 1, wherein a tobacco liquid absorbing piece is arranged on an inside of the atomizing core head end, the tobacco liquid absorbing piece is a hollow body and is tightly attached on an inner wall of the head end of the atomizing core, and a heating wire is arranged close to an inside of the tobacco liquid absorbing piece.

3. The atomizing assembly structure according to claim 1, wherein the tail end of the atomizing core overtops a top part of the tobacco liquid valve, and the tail end is provided with a handle.

4. The atomizing assembly structure according to claim 1, wherein a spacing sleeve is arranged on a periphery of the tobacco liquid valve, and the atomizing sleeve, the spacing sleeve and the top cap together define a liquid storage chamber.

5. The atomizing assembly structure according to claim 4, wherein a liquid path port is defined on a side wall of the spacing sleeve, a valve port is defined on a side wall of the tobacco liquid valve, and the tobacco liquid valve can rotate around an axial line of the tobacco liquid valve.

6. The atomizing assembly structure according to claim 1, wherein an annular sealing ring is arranged between inside of the atomizing sleeve and the threaded sleeve; another sealing ring is further arranged on a bottom of a lower end of the top cap, and the sealing ring is in tight fit with the periphery of the tobacco liquid valve.

7. The atomizing assembly structure according to claim 1, wherein an air passage pipe is arranged at a mid-part of the top cap, and the air passage pipe extends out of a bottom surface of the top cap; and a mouthpiece is connected to an upper end of the air passage pipe.

8. An atomizing assembly structure, comprising an atomizing sleeve, a threaded sleeve and an atomizing core, the atomizing sleeve having a lower end fixed to the threaded sleeve, the atomizing assembly structure further comprising a tobacco liquid valve and a top cap, wherein the atomizing core is arranged inside the tobacco liquid valve, the atomizing core and the tobacco liquid valve are in pluggable connection, the tobacco liquid valve has an upper end connected to the top cap through threads, and the top cap covers and seals the atomizing sleeve;
  wherein the atomizing core comprises a head end of the atomizing core and a tail end of the atomizing core, and the head end and the tail end of the atomizing core are fixed together through threaded connection. and the head end and the tail end of the atomizing core are in threaded connection;
  wherein an air passage pipe is arranged at a mid-part of the top cap, and the air passage pipe extends out of a bottom surface of the top cap; and a mouthpiece is connected to an upper end of the air passage pipe;
  wherein the air passage pipe has a lower end extending into the atomizing core, and a certain gap is defined between an outer wall of the air passage pipe and an inner wall of the atomizing core; the top cap defines an air hole, and the air hole is in communication with the gap between the air passage pipe and the atomizing core.

9. The atomizing assembly structure according to claim 7, wherein the threaded sleeve defines an air hole, and the air hole is in communication with the atomizing core.

10. An atomizing assembly structure, comprising an atomizing sleeve, and an atomizing core, the atomizing assembly structure further comprising a tobacco liquid valve and a top cap, wherein the atomizing core is arranged inside the tobacco liquid valve, the atomizing core and the tobacco liquid valve are in pluggable connection, the tobacco liquid valve has an upper end connected to the top cap, and the top cap covers and seals the atomizing sleeve;
  wherein the atomizing core comprises a head end of the atomizing core and a tail end of the atomizing core;
  the tail end of the atomizing core overtops a top part of the tobacco liquid valve, and the tail end is provided with a handle.

11. The atomizing assembly structure according to claim 10, wherein a tobacco liquid absorbing piece is arranged on an inside of the atomizing core head end, the tobacco liquid absorbing piece is a hollow body and is tightly attached on an inner wall of the head end of the atomizing core, and a heating wire is arranged close to an inside of the tobacco liquid absorbing piece.

12. The atomizing assembly structure according to claim 10, wherein a spacing sleeve is arranged on a periphery of the tobacco liquid valve, and the atomizing sleeve, the spacing sleeve and the top cap together define a liquid storage chamber.

13. The atomizing assembly structure according to claim 12, wherein a liquid path port is defined on a side wall of the spacing sleeve, a valve port is defined on a side wall of the tobacco liquid valve, and the tobacco liquid valve can rotate around an axial line of the tobacco liquid valve.

14. The atomizing assembly structure according to claim 10, wherein the atomizing assembly structure further comprises a threaded sleeve, the atomizing sleeve has a lower end fixed to the threaded sleeve; an annular sealing ring is arranged between inside of the atomizing sleeve and the threaded sleeve; another sealing ring is further arranged on a bottom of a lower end of the top cap, and the sealing ring is in tight fit with the periphery of the tobacco liquid valve.

15. The atomizing assembly structure according to claim 10, wherein an air passage pipe is arranged at a mid-part of the top cap, and the air passage pipe extends out of a bottom surface of the top cap; and a mouthpiece is connected to an upper end of the air passage pipe.

16. The atomizing assembly structure according to claim 15, wherein the air passage pipe has a lower end extending into the atomizing core, and a certain gap is defined between an outer wall of the air passage pipe and an inner wall of the atomizing core; the top cap defines an air hole, and the air hole is in communication with the gap between the air passage pipe and the atomizing core.

17. The atomizing assembly structure according to claim 15, wherein the atomizing assembly structure further comprises a threaded sleeve, the atomizing sleeve has a lower end fixed to the threaded sleeve; the threaded sleeve defines an air hole, and the air hole is in communication with the atomizing core.

* * * * *